Sept. 26, 1961    L. J. BELL    3,001,632
BOTTLE LIFT FOR BOTTLE WASHING MACHINES
Filed Oct. 6, 1959    2 Sheets-Sheet 2

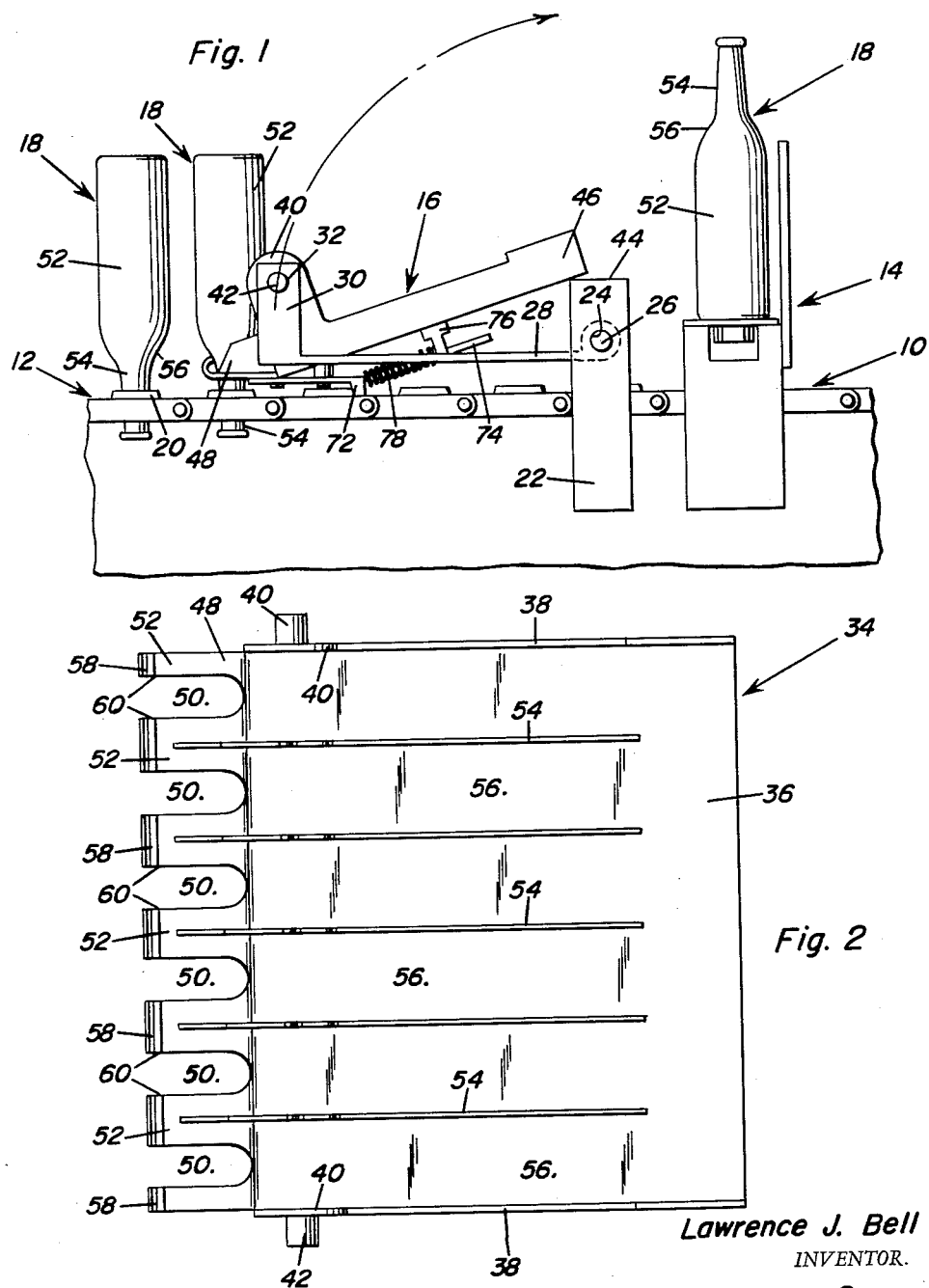

Lawrence J. Bell
*INVENTOR.*

Patented Sept. 26, 1961

3,001,632
BOTTLE LIFT FOR BOTTLE WASHING MACHINES
Lawrence J. Beil, 1205 Schilling Ave., Belleville, Ill.
Filed Oct. 6, 1959, Ser. No. 844,762
7 Claims. (Cl. 198—33)

This invention relates to a novel and useful bottle lift, and more particularly to a bottle lift which is specifically adapted for bottle washing machines of the type disclosed in the patents to P. C. Read, Nos. 2,355,239, filed January 4, 1941, and 2,257,358, filed October 15, 1941.

Bottle washing machines similar to those disclosed in the above mentioned patents incorporate the use of an intermittently movable supply conveyor provided with upwardly opening sockets for receiving inverted bottles and a delivery conveyor with a transfer mechanism being provided for transferring bottle from an inverted position on said supply conveyor to an upright position on the delivery conveyor. The transfer mechanism includes a lift which is pivotally secured at one end to the washing machine and is swingable through an arc from a substantially horizontally disposed recceiving position overlying the supply conveyor to a substantially vertically disposed delivery position adjacent the delivery conveyor. The lift is provided with U-shaped openings which are adapted to receive the narrow neck portions of inverted bottles and which engage the wider portion of the necks of the bottles adjacent the bodies thereof to lift the bottles from the supply conveyor upon the swinging movement of the bottle lift. Although this structure is sufficient to lift the bottles from the supply conveyor, an additional means in the form of plungers or pusher rods are needed to tilt the bottles from a substantially vertical position after they have been disengaged from the sockets of the supply conveyor so that the bottles may fall to a substantially reclining position upon the bottom wall of the lift so that as the latter is moved to a substantially vertically disposed delivery position, the bottles will be positioned in an upright position to be placed on the delivery conveyor. The pusher rods or plungers have not proven to be entirely successful inasmuch as the lateral positioning of the conveyor varies at times as much as a quarter of an inch at the point where the bottles are lifted from the conveyor by the lift mechanism. The plunger or push rods are adapted to poke through the sockets in the conveyor to lift and eject the bottles therefrom and also to facilitate the tilting of the bottom of the bottles over the bottom wall of the bottle lift. Inasmuch as the lateral positioning of the conveyor varies as much as a quarter of an inch, these pusher rods or plungers do not always engage the correct portions of the necks of the bottles, which wedges the plungers or push rods in the pocket where the neck of the bottle is held and breaks the bottle because the bottle has already assumed an inclined position, thereby making it difficult to eject the bottle from the socket. When the push rods or plungers become wedged in this manner, the result is that the bottles, under tremendous stresses because of the positively actuated mechanisms become broken. This is especially true if bottles of varying dimensions are handled by the bottle washing machine without adjustments thereto being made prior to the handling of each different dimensioned type of bottles.

Further, the jamming of the plungers or push rods will often cause the carrying chain or mechanism of the conveyor to wedge against a portion of the lift mechanism, which will stop the conveyor.

Consequently, bottle washing machines of the above-mentioned type, when designed to handle six bottles during each lifting operation, are limited to handling approximately seventy-five cases of bottles per hour.

The main object of this invention is to provide a bottle lift for bottle washing machines which will lift the bottles from a supply conveyor from a point above the conveyor instead of pushing the bottles to eject them from the supply conveyor from therebelow, thereby eliminating the possibility of jamming either the lifting or conveying mechanism due to the bottles being pushed from below.

A further object, in accordance with the preceding object, is to provide a bottle lift which will, without the use of plungers or pusher rods, lift the bottles from a supply conveyor from above the supply conveyor, with a means being provided for tilting the bottles over the lifting mechanism only after they have been disengaged from the supply conveyor.

Yet another object of this invention is to provide a simplified lift mechanism for a bottle washing machine which may be operated at approximately forty percent faster speeds than those most commonly used in the industry today with less breakage of the bottles handled thereby.

A final object to be specifically enumerated herein is to provide a bottle lift for bottle washing machines which will conform to conventional forms of manufacture, be relatively simple in construction and durable so as to provide a device that will be economically feasible and long lasting.

These, together with other objects and advantages which will become subsequently apparent, reside in the details of construction and operation as more fully hereinafter described and claimed, reference being had to the accompanying drawings forming a part hereof, wherein like numerals refer to like parts throughout, and in which:

FIGURE 1 is a side elevational view of the invention shown mounted upon a conventional form of bottle washing machine including a supply conveyor and a delivery conveyor extending transversely of the supply conveyor at a point spaced slightly thereabove;

FIGURE 2 is a top plan view of the bottom lift shown in FIGURE 1 on an enlarged scale;

Figure 3:
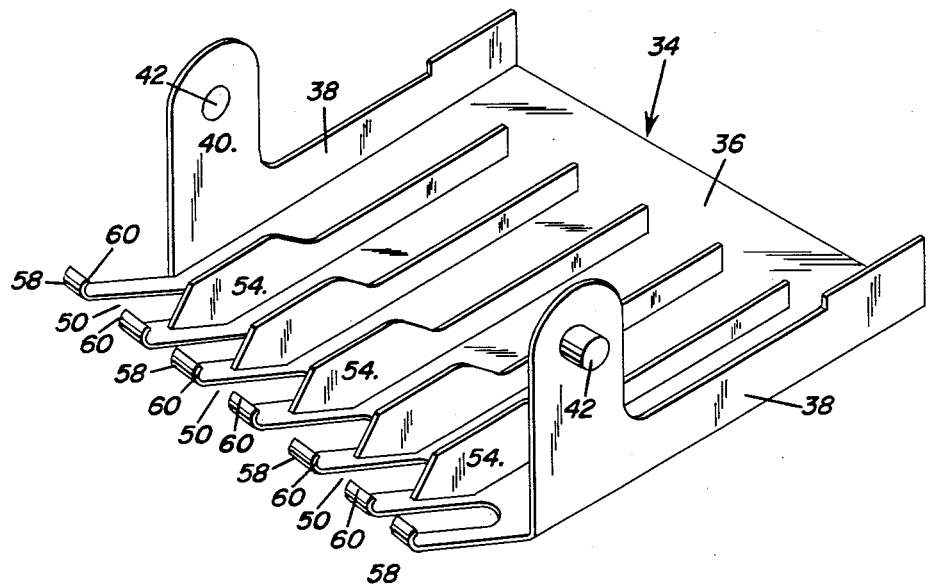
FIGURE 3 is an enlarged perspective view of the bottle lift shown in FIGURE 1.

Referring now more specifically to the drawings, the numeral 10 generally designates a conventional form of bottle washing machine which includes a supply conveyor generally designated by the reference numeral 12 and a delivery conveyor generally designated by the reference numeral 14 which is disposed transversely of the supply conveyor 12 a spaced distance thereabove.

A transfer mechanism, generally designated by the reference numeral 16, is provided for transferring bottles from an inverted position on the supply conveyor to an upright position on the delivery conveyor. The bottles 18 are positioned within sockets 20 in the supply conveyor 12 and are fed towards the transfer mechanism from the left as seen in FIGURE 1. The transfer mechanism 16 includes a pair of supports 22 which are secured to opposite sides of the supply conveyor 12 and are provided with suitable apertures 24 which are aligned and rotatably receive an oscillating operating shaft 26. The oscillating operating shaft 26 is connected with a suitable power source and has secured thereto intermediate the supports 22 one end of each of a pair of lift arms 28. The ends of the lift arms 28 are secured to the shaft 26 in any convenient manner and the lift arms 28 are provided on their other ends with flanges 30 which are suitably apertured as at 32. It will be noted (see FIGURE 1) that the lift arms 28 are movable from between a substantially horizontal position overlying the supply conveyor 12 to a substantially vertical position adjacent the delivery conveyor 14.

The bottle lift plate, generally designated by the reference numeral 34, comprises a portion of the transfer mechanism 16. The lift plate 34 includes a bottom wall 36 having a pair of upstanding sides 38 secured to opposite sides thereof. Each of the upstanding sides 38 is provided with an upstanding lug portion 40 which has secured thereon a laterally projecting pivot pin 42. It will be noted (see FIGURES 2 and 3) that the pivot pins 42 are aligned. The pivot pins 42 are adapted to be rotatably received in the apertures 32, thereby pivotally securing one end portion of the lift plate 36 to the pair of lift arms 28.

It will be noted that the upper end 44 of the supports 22 comprise cam surfaces over which the adjacent end portion 46 of the lift plate 34 is adapted to ride in frictional engagement therewith. As the lift arms 28 are moved through an arc to a substantially vertical position, the lift plate 34 is also rotated through an arc, with the end portion 46 riding over the cam surface 44 to position the latter end portion of the lift plate 36, when the latter is in a vertical position, adjacent to the delivery conveyor 14.

The forward end portion 48 of the lift plate 34 is provided with a plurality of forwardly opening U-shaped openings 50 which are defined by pairs of forwardly projecting spaced shoulder portions 52. Further, the bottom wall 36 is provided with a plurality of upstanding walls 54 which provide a plurality of compartments 56 which are in alignment with the corresponding openings 50.

Each of the shoulders 52 terminates in an upwardly directed backturned portion 58. Each of the backturned portion 58 is provided with at least one corner portion 60 which is in alignment with but spaced from the opening 50.

Each of the bottles 18 comprises a bottom portion 52, a neck portion 54 and an enlarged neck portion 56 which joins the smaller diameter neck portion 54 with the body portion 52.

Figure 4:
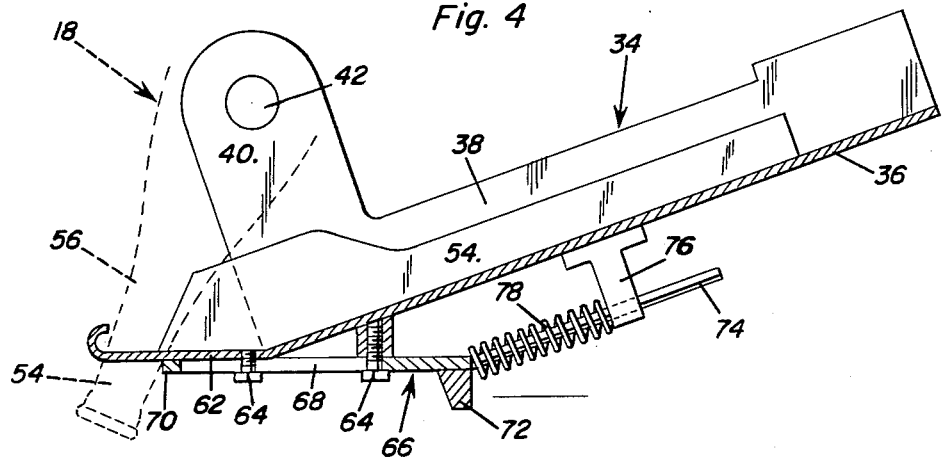
FIGURE 4 is a longitudinal vertical sectional view of the bottle lift taken substantially upon a plane passing through the bottle lift intermediate the sides thereof disclosing the structure of the pusher plate and showing a bottle in phantom lines in a tilted position urged by the pusher plate.

With attention now directed more particularly to FIGURE 4 of the drawings, it will be noted that the bottom wall 36 is provided with an angulated forward portion 62. Further, it will be noted that secured to the bottom wall 36 by means of fasteners 64 there is provided a pusher plate generally referred to by the reference numeral 66. The pusher plate 66 is provided with a longitudinally extending slot 68 which mounts the pusher plate 66 for longitudinal sliding movement to the bottom wall 36. It will be noted that the forward end 70 of the pusher plate 66 is movable to a position extending into the openings 50 formed in the bottom wall 36. The pusher plate 66 is provided at its rearward end with a depending abutment 72 which is adapted at its rearward end with a depending abutment 72 which is adapted to engage each of the sockets 20 of the supply conveyor 12 (see FIGURE 1). The pusher plate 66 is resiliently urged towards a forwardly disposed extended position projecting into the openings 50 by means of a pusher rod 74 which is slidably mounted in a suitably apertured support 76 secured to the bottom wall 38 in any convenient manner. Disposed between the end of the pusher rod 74 adjacent the pusher plate 66 and the support 76 is a compression spring 78 which resiliently urges the pusher rod 74 towards the left as seen in FIGURE 4 to resiliently urge the pusher plate 66 into an extended position projecting into the openings 50.

With attention now directed more particularly to FIGURE 1 of the drawings, it is to be understood that the supply conveyor 12 moves from left to right and that the abutment 72 will engage each of the sockets 20 to resiliently urge the pusher plate 66 into a retracted position upon each movement of the supply conveyor. Each intermittent movement of the supply conveyor 12 positions the neck 54 of a bottle 18 in the opening 50. Then upon operation of the oscillating operating shaft 26 the lift arms 28 will raise the lift plate 34 including the bottom wall 36 which will disengage the abutment 72 from one of the sockets 20 whereby, as the bottle 18 is lifted clear of the socket 20, the pusher plate 66 will be released and allowed to move forward, under the pressure of the compression spring 78, towards a position extending into the openings 50 whereby the forward edge 70 of the pusher plate 66 will engage the portion of the neck 54 of the bottle 18 disposed beneath the shoulders 52 to pivot that portion outwardly of the bottom wall 36, thereby pivoting the upper portion or the bottom of the inverted bottle 18 over the bottom wall 36. Further movement of the oscillating shaft 26 to raise the lift arms 28 will then cause the bottle 18 to fall to a reclining position in a compartment 56 until the lift arms 28 approach the vertical position, whereupon the bottle 18 will be positioned in a substantially upright position and slide downwardly onto the delivery conveyor 14.

It is to be noted that each of the backturned portions 58 is disposed on an opposite side of the neck 54 of a bottle 18 disposed in the openings 50 and that the corners 60 embrace the side of the neck 54 remote from the bottom wall 36 to tilt the bottle 18 as heretofore set forth as the lift plate 36 lifts the bottle 18 clear of the conveyor 12. Therefore, the pusher plate 66, although shown and described herein, is not required for completely satisfactory operation of the bottle lift inasmuch as the backturned portions 58 having the corners 60 thereon serve to tilt the bottles 18 over the bottom wall 36 as soon as the neck portions 54 of the bottles have been lifted free from the sockets 20. Also, the inclined portion 62 of the bottom wall 36 is provided to enable the shoulder portions 52 to embrace the neck portions 54 of the bottles 18 at right angles thereto while not requiring that the bottles 18 move through an arc of as much as 90° when falling into a reclined position in the compartments 56.

Still further, it will be noted that the pivot pins 40 project beyond the remote surfaces of the flanges 30. It is to be understood that these projecting pins 42 are adapted to be engaged by an intermittently reciprocating lift rod (not shown) if desired to lift the lift plate 34 just enough to disengage the bottles 18 from the sockets 20 and cause them to fall to reclined positions in compartments 56 prior to the lifting of the transfer mechanism by the shaft 26. These successive steps in transferring the bottles 18 greatly reduce the number of bottles broken inasmuch as they are in a reclined position before the transfer mechanism is actuated.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:
1. In a bottle washing machine including an intermittently movable supply conveyor provided with upwardly opening sockets for receiving inverted bottles and a delivery conveyor with a transfer mechanism being provided for transferring bottles from an inverted position on said intermittently movable conveyor to an upright position on said delivery conveyor which includes a pair of spaced supports positioned on opposite sides of said intermittently movable conveyor having an oscillating operating shaft journalled therethrough to which one end of each of a pair of lift arms is secured for movement therewith at each side of said intermittently movable conveyor, the other ends of said lift arms being provided with apertured flanges whose apertures are aligned, said transfer mechanism also including an intermittently reciprocating lift rod, said lift rod, operating shaft and said intermittently movable conveyor being movable in timed sequence; a lift plate comprising a generally U-shaped plate having two upstanding side walls interconnected at their lower edges by means of a bottom wall, means on said side walls for mounting said plate for pivotal movement about a horizontal axis extending between said flanges, said means being positioned adjacent one end of said bottom wall, the other end of said end wall being adapted to overlie and be supported by said supports, whereby said lift plate will be mounted for swinging movement through an arc and for swinging movement relative to said lift arms, at least one U-shaped opening adapted to receive the neck of an inverted bottle carried by said conveyor formed in said one end of said bottom wall defined by a pair of outwardly projecting spaced shoulders, the base ends of each of said shoulders being provided with an upwardly projecting backturned portion adapted to engage the side of a neck of a bottle remote from said bottom positioned in said opening whereby as lifting movement of said lift arms lifts said plate said backturned portions will lift a bottle from one of said sockets and tilt the bottom of the bottle over said plate in a single motion so as to cause said bottle to fall in a reclined position on said plate.

2. In a bottle washing machine of the type having a supply conveyor provided with upwardly opening sockets for receiving inverted bottles and a delivery conveyor with a transfer mechanism being provided for transferring bottles from an inverted position on said supply conveyor to an upright position on said delivery conveyor, which mechanism includes a pair of lift arms pivotally mounted at one end for oscillating swinging movement from a substantially horizontally disposed receiving position over said supply conveyor to a substantially vertically disposed delivery position adjacent said delivery conveyor, a lift plate comprising a bottom wall, means connected to said bottom wall adjacent one end thereof for mounting the latter between the free ends of said lift arms for pivotal movement about a horizontal axis with said bottom wall extending from said one end in the direction of travel of said supply conveyor toward said delivery conveyor, at least one U-shaped opening adapted to receive the narrow neck portion of a bottle formed in said one end defined by a pair of outwardly projecting spaced shoulders, the free ends of each of said shoulders being provided with an upwardly projecting backturned portion adapted to engage one side of the neck of the bottle remote from said bottom whereby initial lifting movement of said lift arms toward the delivery position will engage the backturned portions with the wider portion of the neck of the bottle adjacent the body thereof and lift the bottle from said socket and tilt the bottom of the bottle over said plate whereby further movement of the lift arms will cause the bottle to fall in an inclined position on said plate to be thereafter swung to an upright position and deposited on said delivery conveyor upon final movement of the lift arms toward the delivery position.

3. The combination of claim 2 wherein said supply conveyor is provided with a plurality of transversely spaced longitudinally extending rows of sockets and said bottom wall is provided with a plurality of said openings adapted to be aligned with the corresponding row of sockets, said bottom wall including a plurality of upstanding longitudinally extending walls defining separate compartments in alignment with said openings.

4. The combination of claim 3 wherein each of the upstanding walls on opposite sides of said bottom wall is provided with an upstanding lug, the free ends of each of said lift arms being provided with an upstanding apertured flange, said mounting means including a laterally projecting pivot pin secured to each of said lugs rotatably receivable through one of said apertured flanges.

5. The combination of claim 1 wherein said supply conveyor is provided with a plurality of transversely spaced longitudinally extending rows of sockets and said bottom wall is provided with a plurality of said openings adapted to be aligned with the corresponding row of sockets, said bottom wall including a plurality of upstanding longitudinally extending walls defining separate compartments in alignment with said openings.

6. The combination of claim 2 including a pusher plate slidably mounted to the undersurface of said bottom wall for longitudinal movement toward and away from said opening, means resiliently urging said pusher plate toward an extended position projecting into said opening for engagement of the neck of a bottom disposed therein, wherein said pusher plate pushes the portion of a bottle disposed below said opening away from said bottom to thereby assist in tilting the bottom of the bottle over said bottom wall.

7. The combination of claim 6 wherein said pusher plate has depending therefrom an abutment adapted to engage said sockets on said conveyor whereby said pusher plate will be retracted upon movement of said supply conveyor to position a bottle in said opening and will be disengaged from said socket and move toward the extended position upon lifting movement of said bottom wall.

References Cited in the file of this patent

UNITED STATES PATENTS

| | | |
|---|---|---|
| 1,856,976 | Strelow | May 3, 1932 |
| 2,191,227 | Dostal | Feb. 20, 1940 |

FOREIGN PATENTS

| | | |
|---|---|---|
| 748,141 | France | Apr. 10, 1933 |